June 13, 1961 — M. C. HESSE — 2,988,052
POSITIVE FEED FOR CATTLE OILERS
Filed April 9, 1959 — 2 Sheets-Sheet 1

INVENTOR
MYRON C. HESSE

BY *Wright and Wright*

ATTORNEYS

June 13, 1961  M. C. HESSE  2,988,052
POSITIVE FEED FOR CATTLE OILERS
Filed April 9, 1959  2 Sheets-Sheet 2
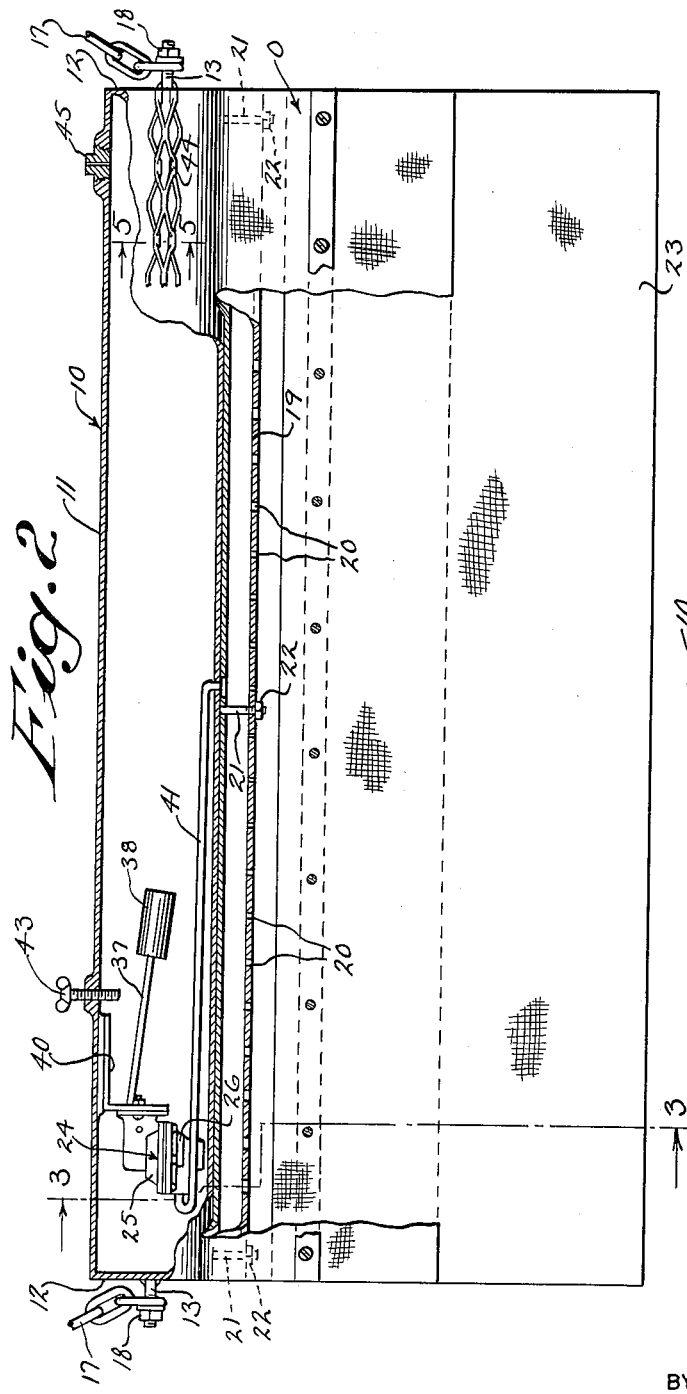
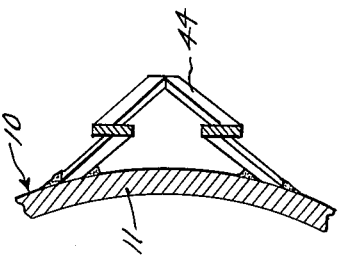
INVENTOR
MYRON C. HESSE
BY *Wright and Wright*
ATTORNEYS United States Patent Office 2,988,052
Patented June 13, 1961

2,988,052
POSITIVE FEED FOR CATTLE OILERS
Myron C. Hesse, Pender, Nebr.
Filed Apr. 9, 1959, Ser. No. 805,230
3 Claims. (Cl. 119—157)

This invention appertains to a novel device for applying a liquid, such as oil, or an insecticide, or a combination of both, to livestock of the type embodying a tank or reservoir for the liquid mounted for rocking movement and operated by the passage of livestock thereunder.

One of the primary objects of my present invention is to provide a novel means for positively delivering a desired quantity of the liquid to the wiping apron each time the tank or reservoir is rocked or turned incident to the livestock passing under the tank and apron.

Another salient object of my invention is the provision of a pump carried by the tank or reservoir having an inlet communicating with the liquid in the tank and an outlet communicating with the liquid distributor from which the wiping apron is suspended, the pump being actuated by a weight operated lever, so that each time the tank is rocked or turned by an animal the pump will be operated for positively delivering a desired quantity of the liquid to the distributor.

A further important object of my invention is the provision of novel means for adjusting the stroke of the weight operated lever from the exterior of the tank or reservoir whereby an exact predetermined quantity of oil will be delivered by the pump to the distributor upon each operation of the pump.

A still further important object of my invention is the provision of a novel form of back scratcher for the animals carried by each side of the tank, the scratcher being of such a character as to facilitate the distribution of the oil or insecticide into the hair of the animals and so that the oil or insecticide will reach the hide of the animals.

A still further important object of my invention is to provide a cattle oiler of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed, and illustrated in the accompanying drawings, in which drawings FIGURE 1 is a front elevational view of my improved cattle oiler;

FIGURE 2 is an enlarged front elevational view illustrating the oil reservoir tank, the applicator or wiping apron and the pump for delivering a measured quantity of oil to the apron, parts of the view being shown broken away and in section to illustrate structural detail;

FIGURE 5 is an enlarged fragmentary detail transverse sectional view through the tank or reservoir taken on the line 5—5 of FIGURE 2, looking in the direction of the arrows, the view illustrating the improved back-scratcher.

Figure 1:
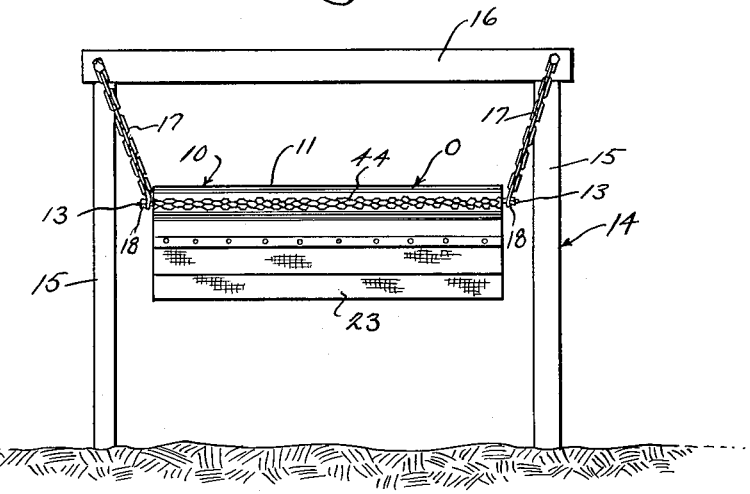

Referring to the drawings in detail, wherein similar reference characters designate corresponding parts throughout the several views, the letter O generally indicates my improved oiler for livestock and the same includes a horizontally disposed reservoir tank 10. The tank is preferably cylindrical in shape, for a purpose, which will later appear, and the tank can be fabricated in any desired way and includes a cylindrical body 11 having end heads 12. The end heads 12 can be welded to the cylindrical body, should such be preferred. Welded or otherwise secured to the axial centers of the end walls or heads of the tank are stub shafts 13. The outer ends of these stub shafts are preferably threaded.

The tank 10 is freely suspended from its axially disposed stub shafts from a suitable frame 14 or other overhead support. The frame 14 can include spaced uprights or posts 15 and a top cross-bar 16.

Secured to the upper corners of the frame 14 are depending chains 17 or flexible cables and the lowermost links of the chains are passed over the stub shafts 13. Nuts 18 can be threaded on the stub shafts to prevent accidental displacement of the chains 17 from the stub shafts. These stub shafts, and consequently the reservoir tank 10, are freely rotatable in the chains and the tank is free to swing with the chains.

Disposed below the tank 10 and extending the full length thereof is an oil distributing trough 19. This trough is preferably formed from angle iron for the sake of simplicity and cost and this trough at its apex is provided with a row of spaced oil drip openings 20. The openings 20 preferably increase in size from the transverse center of the trough toward its terminals. The trough is so disposed that the flanges or side walls thereof extend uppermost with its angle and openings lowermost. A plurality of depending studs 21 are welded, or otherwise secured, to the bottom of the tank and these studs extend through the openings in the trough. Nuts 22 are threaded on the studs tight against the lower edge of the trough for drawing the upper edges of the trough against the bottom of the tank. The trough carries an applicator or distributor apron 23, which is of the same type as shown in my mentioned pending application and oil or other liquid flowing from the reservoir tank 10 into the distributor trough will be distributed to the applicator apron 23.

From the description so far, it can be seen that when an animal walks under the reservoir tank 10 that the animal will engage the apron and the apron will wipe along the animal's back and that the tank will rock and swing on the chains 17.

One of the important features of this invention is to provide a simple and novel means for positively insuring the delivering of a desired quantity of oil to the distributor trough 19 each time the reservoir tank is rocked or swung by an animal passing thereunder. This means includes a pump 24 which can be positioned either exteriorly or interiorly of the tank. As illustrated, I preferably enclose the pump within the reservoir tank 10. This pump 24 is of a type commonly used for delivering gasoline to the carburetor of an internal combustion engine, and hence, the pump if of the diaphragm type. The pump 24 includes upper and lower casing sections 25 and 26, and these sections hold the diaphragm 27 therebetween. The lower pump section 26 includes an inlet port 28 and an outlet port 29. These ports are controlled by oppositely working spring pressed valves 30 and 31. On an upstroke of the diaphragm 27, the valve 30 will be opened and the valve 31 will be drawn on its seat and oil will be sucked in through the port 28 into the main chamber of the pump. On the down stroke of the diaphragm the valve 30 will be closed and the valve 31 will be forced open and the oil will be forced out through the port 29. An expansion coil spring 32 is employed for normally urging the diaphragm 27 to a lowered position. The inlet port 28 communicates with the interior of the reservoir tank and the outlet port 29 communicates with the distributor trough 19, as will later appear. The axial center of the diaphragm 27 carries a stem 33 and this stem is pivotally connected to the inner end of the weight operated lever 34. The lever is rockably mounted on a cross-shaft 35 carried by the casing or housing of the pump, and this cross-shaft 35 divides the lever into an inner short arm 36 and an outwardly extending long arm 37. The outer end of the long arm of the lever has secured thereto a weight 38 of a desired mass. The outer end of the lever is normally urged to a raised position by an expansion coil spring 39 which is interposed between the long arm of the lever and a part of the pump housing or casing.

With the pump arranged inside of the tank, the same is secured to a bracket plate 40 and the upper end of this plate 40 is in turn welded or otherwise secured to the inner surface of the reservoir tank 10 at the upper portion thereof. The pump is placed in position inside of the tank prior to the securing of the end walls or heads in place.

The outlet port 29 has communicating therewith a feed tube 41 and this tube extends toward the center of the reservoir tank 10 and opens out through the tank 10 into the distributor trough 19. The inlet port 28 can have communicating therewith a short length of pipe or tube 42 and this tube should communicate with the lower part of the oil reservoir tank.

Figure 3:
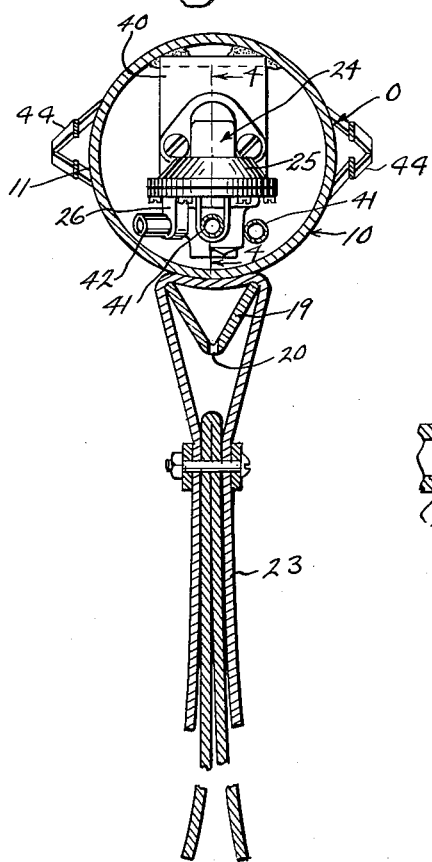
FIGURE 3 is a transverse sectional view through the cattle oiler taken on the line 3—3 of FIGURE 2, looking in the direction of the arrows, the pump being shown in end elevation.
Figure 4:
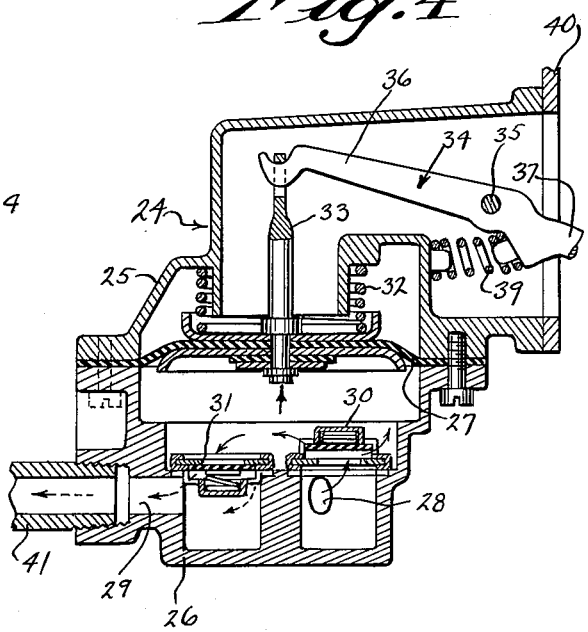
FIGURE 4 is an enlarged detail vertical sectional view through the pump, the section being taken on the line 4—4 of FIGURE 3, looking in the direction of the arrows.

Considering that the reservoir tank 10 is in its normal position, as shown in FIGURES 2, 3 and 4, then the long arm of the lever 37 is held in its downward position by the weight 38 with the inner end of the lever in a raised position holding the diaphragm 27 in a raised position against the tension of the spring 32. With the rocking of the tank beyond a predetermined point, the lever 37 will be swung by the weight 38 so as to move the inner end of the lever 36 downwardly and inwardly, thus forcing the diaphragm 27 inwardly to a pump discharging position. This is aided by the spring 32. As the tank moves to its upright position the weight will again swing down moving the inner end of the lever upwardly.

The stroke of the pump can be regulated by a set screw 43 threaded in the tank, and the inner end of the screw is disposed in the path of the movement of the long arm 37 of the lever 34. Obviously, by threading the screw 43 inwardly the lever will have a shorter stroke and by threading the screw 43 outwardly the lever will have a longer stroke. Thus, the amount of oil delivered to the trough 19 on each rocking movement of the tank can be regulated by the set screw 43.

In conjunction with my improved oiler, I use a novel type of back scratcher 44. This scratcher is formed from heavy gauge reticulated metal and can be formed from expanded metal bent longitudinally to form a V in cross-section. The scratcher is welded to the tank and there is a scratcher on each side of the tank.

Again, when an animal passes under the tank, the tank is rocked and the scratcher 44 will engage the animal's back and work the hair of the animal back and forth so as to insure the penetration of the oil into the hide of the animal. Great stress is laid on this type of scratcher, as the same forms an admirable means for engaging the animal's back and working the hair back and forth. This is accomplished by the openings in the expanded material.

If preferred, more than one pump can be utilized with the reservoir and where say two pumps are utilized, it is preferable to have a pump arranged adjacent to each end of the reservoir tank.

The reservoir tank is provided at its upper end with a vent and filler plug 45.

Changes in details may be made without departing from the spirit or the scope of this invention, but what I claim as new is:

1. An oiling and rubbing device for animals comprising an overhead support, an elongated reservoir tank for liquid suspended from said support for free rolling and tilting movement, an applicator for the oil depending from said tank, liquid distributing means firmly secured to the tank for movement therewith extending the full length of the tank and the applicator for uniformly supplying liquid to the applicator throughout its length, and a weight operated diaphragm pump mounted in and enclosed by said tank, a conduit having one end connected to said pump and a second end in liquid supplying position to said liquid distributing means, said liquid distributing means having outlet openings along its length, said openings increasing progressively in size as their distance from said second end increases to bring about the uniform supplying of liquid to the applicator throughout its length.

2. An oiling and rubbing device for animals as defined in claim 1, and said weight operated diaphragm pump including a pivotally operated lever operatively connected to the diaphragm of the pump having a weight normally holding the outer end of the lever in a lowered position, the lever being movable by said weight to another position upon the rolling and swinging movement of the tank.

3. An oiling and rubbing device for animals as defined in claim 2, and adjustable means operable from the exterior of the tank and disposed in the path of the lever for limiting the swinging movement of the lever.

References Cited in the file of this patent

UNITED STATES PATENTS

| | | |
|---|---|---|
| 987,433 | Crawford | Mar. 21, 1911 |
| 1,325,773 | Babendreer | Dec. 23, 1919 |
| 1,515,981 | Wheeler | Nov. 18, 1924 |
| 2,690,162 | Kremer | Sept. 28, 1954 |
| 2,711,722 | Gray | June 28, 1955 |
| 2,768,608 | Anderson | Oct. 30, 1956 |
| 2,814,272 | Worden | Nov. 26, 1957 |